US009380478B2

United States Patent
Yang (10) Patent No.: US 9,380,478 B2
(45) Date of Patent: Jun. 28, 2016

(54) UPDATING METHOD FOR TRIGGER MESSAGE COUNTER, MACHINE TYPE COMMUNICATION SERVER AND TERMINAL

(75) Inventor: Kun Yang, Shenzhen (CN)

(73) Assignee: ZTE CORPORATION (CN)

( * ) Notice: Subject to any disclaimer, the term of this patent is extended or adjusted under 35 U.S.C. 154(b) by 102 days.

(21) Appl. No.: 14/237,003

(22) PCT Filed: May 22, 2012

(86) PCT No.: PCT/CN2012/075868
§ 371 (c)(1),
(2), (4) Date: Feb. 4, 2014

(87) PCT Pub. No.: WO2013/143218
PCT Pub. Date: Oct. 3, 2013

(65) Prior Publication Data
US 2014/0220965 A1  Aug. 7, 2014

(30) Foreign Application Priority Data

Mar. 27, 2012  (CN) .......................... 2012 1 0084369

(51) Int. Cl.
*H04W 4/00* (2009.01)
*H04W 24/08* (2009.01)
(Continued)

(52) U.S. Cl.
CPC .............. *H04W 24/08* (2013.01); *H04W 4/005* (2013.01); *H04W 8/02* (2013.01); *H04W 8/22* (2013.01); *H04W 24/02* (2013.01); *H04W 28/0215* (2013.01); *H04W 28/12* (2013.01)

(58) Field of Classification Search
USPC ........... 455/410–411, 412.1–413, 414.4, 415, 455/432.3, 433, 435.1, 466
See application file for complete search history.

(56) References Cited

U.S. PATENT DOCUMENTS

| 2011/0039587 A1* | 2/2011 | Madhavan | .............. | H04W 4/14 455/466 |
| 2014/0219182 A1* | 8/2014 | Chandramouli | ...... | H04W 4/005 370/328 |

(Continued)

FOREIGN PATENT DOCUMENTS

| CN | 102111739 A | 6/2011 |
| CN | 102158835 A | 8/2011 |

(Continued)

OTHER PUBLICATIONS

Extended European Search Report Dated Jul. 31, 2015, Application No. 12872792.2-1854 / 2731367, Applicant ZTE Corporation, 14 Pages.

(Continued)

*Primary Examiner* — Dai A Phuong
(74) *Attorney, Agent, or Firm* — Brooks Kushman P.C.

(57) ABSTRACT

An updating method for a trigger message counter, a machine type communication server and a terminal are provided. The updating method for the trigger message counter includes: a machine type communication (MTC) server setting a trigger message counter locally, setting an upper limit and a lower limit of the trigger message counter and initializing a value of the trigger message counter; the MTC server sending trigger message to a terminal through a machine type communication-interworking function (MTC-IWF); and the MTC server receiving confirmation message returned by the terminal, and updating the value of the trigger message counter according to the confirmation message. With the above-mentioned updating method, the machine type communication server and the terminal, the server or the terminal is enabled to set and update the trigger message counter correctly, thus preventing the terminal or the server from detecting, responding to or canceling the trigger message wrongly.

15 Claims, 2 Drawing Sheets

(51) Int. Cl.
*H04W 8/02* (2009.01)
*H04W 8/22* (2009.01)
*H04W 24/02* (2009.01)
*H04W 28/12* (2009.01)
*H04W 28/02* (2009.01)

(56) References Cited

U.S. PATENT DOCUMENTS

| | | | | |
|---|---|---|---|---|
| 2014/0286162 | A1* | 9/2014 | Kim | H04W 8/02 370/230 |
| 2015/0304796 | A1* | 10/2015 | Xu | H04W 4/005 370/329 |
| 2016/0007390 | A1* | 1/2016 | Starsinic | H04W 76/021 370/328 |
| 2016/0014717 | A1* | 1/2016 | Wang | H04W 4/005 455/458 |

FOREIGN PATENT DOCUMENTS

| | | |
|---|---|---|
| GB | 2476415 A | 6/2011 |
| WO | 2011123755 A1 | 10/2011 |

OTHER PUBLICATIONS

Research in Motion UK Limited, "Proposed Modifications on Device Triggering Procedure", SA WG2 Meeting #89, S2-120754, Feb. 6-10, 2012—Vancouver, Canada, Retrieved Jan. 31, 2012, 6 Pages.

Defense Advanced Research Projects Agency, "Transmission Control Protocol DARPA Internet Program Protocol Specification", Dated Sep. 1981, RFD: 793, 90 Pages.

3GPP, "3rd Generation Partnership Project; Technical Specification Group Services and System Aspects; System Improvements for Machine-Type Communications" (Release 11), 3GPP TR 23.888 V1.6.1 (Feb. 2012), 165 Pages.

3GPP, "3rd Generation Partnership Project; Technical Specification Group Services and System Aspects; Architecture enhancements to facilitate communications with packet data networks and applications" (Release 11), 3GPP TS 23.682 V11.0.0 (Mar. 2012), 24Pages.

PCT International Search Report Dated Jan. 10, 2013, Applicant ZTE Corporation, Application No. PCT/CN2012/075868, 3 Pages.

* cited by examiner

FIG. 1

| The MTC server sets a trigger message counter locally, and sets an upper limit and a lower limit of that trigger message counter and initializes a value of that trigger message counter | 21 |

↓

| The MTC server sends trigger message to a terminal through an MTC-IWF | 22 |

↓

| The MTC server receives confirmation message returned by the terminal, and updates the value of the trigger message counter according to the confirmation message | 23 |

UPDATING METHOD FOR TRIGGER MESSAGE COUNTER, MACHINE TYPE COMMUNICATION SERVER AND TERMINAL

CROSS-REFERENCE TO RELATED APPLICATIONS

This application is a U.S. national phase of PCT Application No. PCT/CN2012/075868 filed May 22, 2012 which claims priority to Chinese Application No. 201210084369.6 filed Mar. 27, 2012, the disclosures of which are incorporated in their entirety by reference herein.

TECHNICAL FIELD

The present document relates to the terminal communication field, and in particular, to an updating method for a trigger message counter, a machine type communication server and a terminal.

BACKGROUND OF THE RELATED ART

Figure 1:
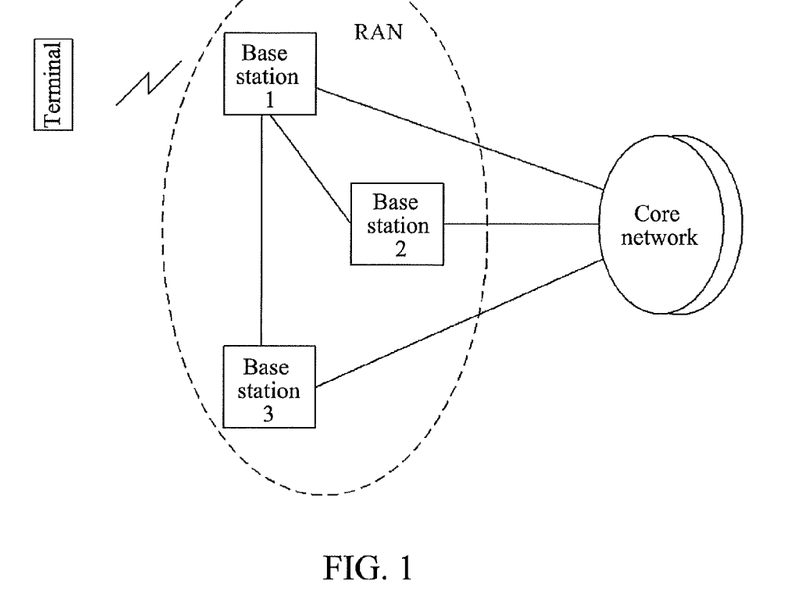
FIG. 1 is a framework diagram of a cellular wireless communication system.

As shown in FIG. 1, the cellular wireless communication system is mainly composed of a Core Network (abbreviated as CN), a Radio Access Network (abbreviated as RAN) and terminals. The core network is responsible for the non-access stratum business, such as terminal location update, etc., and it is the anchor point of the user side. The access network includes a base station, or a base station and a base station control, and the access network is responsible for the access stratum business (such as the management of the wireless resources). The physical or logical connection can exist according to the actual conditions among the base stations, such as the connection between the base station 1 and the base station 2 and the base station 3 in FIG. 1, and each base station can be connected with one or more than one core network nodes. The terminals, which are user equipments (abbreviated as UE), refer to various equipments that can communicate with the cellular wireless communication network, such as the mobile phone or the notebook computer, etc.

The network element in that system is described hereinafter:

The mobility management unit (the mobility management entity (MME) or the Service General Packet Radio Service (GPRS) Supporting Node (SGSN) or the Mobile Switching Center (MSC)) is a unit that is responsible for managing the terminal access control, the location information updating and switching in the core network, and is responsible for the non-access stratum signaling control from the core network to the terminal and registering the terminal to the network.

The home subscriber server (HSS) is an entity that is responsible for storing the identity information, the authentication information and the authorization information, etc. of the terminal device in the core network. According to various situations, the HSS can be used for storing the user identity information and the binding information of the user and the terminal device, or only storing the user identity information (the binding information of the user and the terminal device can be stored by the gateway), or storing the identity information of the terminal device directly. The HSS is also responsible for the subscription database of the user, and performing the identity authentication and authorization of the user, etc. The service platform can inquire the user or terminal information from the HSS.

The machine type communication (MTC)-interworking function (IWF) is a connection entity between the mobile communication network and the external public network, and can realize functions such as protocol conversion, address inquiry, information storage, etc. The interworking function is connected to the MTC server externally and may be connected to the HSS internally, or the network elements of the mobile communication network such as the MME/SGSN/MSC, etc.

Usually there are some services, such as the control management system, which need to obtain the monitoring data from the control terminal, and need to trigger the terminal to establish the connection with the server through the server to report the needed data. Then, the terminal needs to response immediately after receiving the trigger message of the server, and establishes the connection with the server. At present, in order to meet the trigger demand of the server to the terminal, by including a trigger request counter in the trigger message, the existing solution attempts to enable the terminal to detect the repeated trigger requests and associate with the confirmation message of the trigger request, and also enables the server to cancel the trigger request.

However, in the related art, there is not a mechanism that the server and the terminal can set and update a trigger message counter correctly yet, and this must cause that the terminal or the server detects, responses to or cancels the trigger message wrongly, so that the terminal is failed to be triggered or the network storage resources are wasted.

SUMMARY OF THE INVENTION

The embodiments of the present document provide an updating method for a trigger message counter, a machine type communication server and a terminal, to enable the server and the terminal to set and update the trigger message counter correctly, to prevent the terminal or the server from detecting, responding to or cancelling the trigger message wrongly.

The embodiments of the present document provide an updating method for a trigger message counter, comprising:

a machine type communication (MTC) server setting a trigger message counter locally, setting an upper limit and a lower limit of the trigger message counter and initializing a value of the trigger message counter;

the MTC server sending trigger message to a terminal through a machine type communication-interworking function (MTC-IWF); and the MTC server receiving confirmation message returned by the terminal, and updating the value of the trigger message counter according to the confirmation message.

Preferably, the MTC server setting a trigger message counter locally, setting an upper limit and a lower limit of the trigger message counter and initializing a value of the trigger message counter comprises:

the MTC server setting a trigger sequence-number counter locally, and setting an upper limit and a lower limit of the trigger sequence-number counter and initializing a value of the sequence-number counter as zero.

Preferably, the MTC server sending the trigger message to the terminal through the MTC-IWF comprises:

the MTC server sending the trigger message to the MTC-IWF, wherein, the trigger message includes an external identification and a trigger sequence number of the terminal;

the MTC-IWF receiving the trigger message, finding a short message service center (SMS-SC) where the terminal is located according to the external identification of the terminal included in the trigger message, and an one-to-one mapping table between the external identification and an internal identification of the terminal and a many-to-one mapping table between the internal identification and the SMS-SC stored locally, and sending newly-structured trigger message to the found SMS-SC, wherein, the newly-structured trigger message includes the trigger sequence number and terminal route information;

the SMS-SC receiving the newly-structured trigger message, and sending short message carrying the newly-structured trigger message to the terminal through a mobility management unit according to the terminal route information included in the newly-structured trigger message; and wherein, the mobility management unit comprises one or more of a mobility management entity (MME), a Service General Packet Radio Service Supporting Node (SGSN) and a Mobile Switching Center (MSC).

Preferably, the MTC server sending the trigger message to the terminal through the MTC-IWF comprises:

the MTC server sending the trigger message to the MTC-IWF, wherein, the trigger message includes the external identification and the trigger sequence number of the terminal;

the MTC-IWF receiving the trigger message, finding a mobility management unit where the terminal is located according to the external identification of the terminal included in the trigger message, and an one-to-one mapping table between the external identification and an internal identification of the terminal and a many-to-one mapping table between the internal identification and the mobility management unit stored locally, and sending newly-structured trigger message to the found mobility management unit, wherein, the newly-structured trigger message includes the trigger sequence number and the internal identification of the terminal;

the mobility management unit receiving the newly-structured trigger message, and sending a non-access stratum signaling (NAS) carrying the newly-structured trigger message to the terminal; and wherein, the mobility management unit comprises one or more of the MME, the SGSN and the MSC.

Preferably, the MTC server receiving confirmation message returned by the terminal, and updating the value of the trigger message counter according to the confirmation message, comprises:

the MTC server receiving confirmation message representing that the receiving is successful returned by the terminal, and increasing the value of the trigger sequence-number counter by one; or the MTC server receiving confirmation message representing that the receiving is failed returned by the terminal, and keeping the value of the trigger sequence-number counter unchanged.

Preferably, after the MTC server receives the confirmation message representing that the receiving is failed returned by the terminal, the method further comprises: the MTC server canceling or resending the trigger message.

Preferably, after the MTC server increases the value of the trigger message counter by one, the method further comprises: after the MTC server determines that the value of the trigger sequence-number counter exceeds the upper limit, the MTC server resetting the value of the trigger sequence-number counter as zero.

Preferably, the MTC server setting the trigger message counter locally, and setting the upper limit and the lower limit of the trigger message counter and initializing the value of the trigger message counter further comprises:

the MTC server setting a trigger attempt counter locally, and setting an upper limit and a lower limit of the trigger attempt counter and initializing a value of the trigger attempt counter as zero.

Preferably, during the process of the MTC server sending the trigger message to the terminal through the MTC-IWF, every time the MTC server sends the trigger message of a same trigger sequence number to the terminal through the MTC-IWF, the value of the trigger attempt counter is increased by one; or, if the MTC server sends the trigger message of a next trigger sequence number to the terminal through the MTC-IWF, then the value of the trigger attempt counter is reset as zero; or, if the value of the trigger attempt counter equals to the upper limit of the trigger attempt counter, the MTC server fails to send the trigger message of a current trigger sequence number, then the MTC server cancels the trigger message of the current trigger sequence number, and resets the value of the trigger attempt counter as zero when initiating the trigger message of the next trigger sequence number.

Preferably, during the process of the MTC server updating the value of the trigger message counter according to the confirmation message, if the value of the trigger sequence-number counter is increased by one, then the value of the trigger attempt counter keeps unchanged; or, if the value of the trigger sequence-number counter is kept unchanged, then the value of the trigger attempt counter is increased by one.

The embodiments of the present document further provide an updating method for a trigger message counter, comprising:

a terminal setting a trigger sequence-number counter locally, and initializing a value of the trigger sequence-number counter; and the terminal receiving trigger message sent through a machine type communication-interworking function (MTC-IWF) by an MTC server, and updating the value of the trigger sequence-number counter according to a trigger sequence number included in the trigger message, and returning confirmation message to the MTC server.

Preferably, the trigger sequence number is included in a trigger request counter in the trigger message.

The embodiments of the present document further provide a machine type communication (MTC) server, comprising:

a setting module, configured to set a trigger message counter locally, and set an upper limit and a lower limit of the trigger message counter and initialize a value of the trigger message counter;

a sending module, configured to send trigger message to a terminal through a machine type communication -interworking function (MTC-IWF); and a processing module, configured to receive confirmation message returned by the terminal, and update the value of the trigger message counter according to the confirmation message.

Preferably, the setting module is configured to set a trigger sequence-number counter locally, and set an upper limit and a lower limit of the trigger sequence-number counter and initialize a value of the sequence-number counter as zero.

Preferably, the processing module is configured to receive confirmation message representing that the receiving is successful returned by the terminal, and increase the value of the trigger sequence-number counter by one; or receive confirmation message representing that the receiving is failed returned by the terminal, and keep the value of the trigger sequence-number counter unchanged.

Preferably, the processing module is further configured to reset the value of the trigger sequence-number counter as zero after determining that the value of the trigger sequence-number counter exceeds the upper limit.

Preferably, the setting module is further configured to set a trigger attempt counter locally, and set an upper limit and a lower limit of the trigger attempt counter and initialize a value of the trigger attempt counter as zero.

Preferably, the sending module is further configured to: every time sending the trigger message of a same trigger sequence number to the terminal through the MTC-IWF, increase the value of the trigger attempt counter by one; or, if sending the trigger message of a next trigger sequence number to the terminal through the MTC-IWF, then reset the value of the trigger attempt counter as zero; or, if the value of the trigger attempt counter equals to the upper limit of the trigger attempt counter and the trigger message of a current trigger sequence number is failed to be sent, then reset the value of the trigger attempt counter as zero when initiating the trigger message of the next trigger sequence number.

Preferably, the processing module is further configured to: if the value of trigger sequence-number counter is increased by one, then keep the value of the trigger attempt counter unchanged; or, if the value of trigger sequence-number counter is kept unchanged, then increase the value of the trigger attempt counter by one.

The embodiments of the present document further provide a terminal, comprising:

a setting module, configured to set a trigger sequence-number counter locally, and initialize a value of the trigger sequence-number counter; and a processing module, configured to receive trigger message sent through a machine type communication-interworking function (MTC-IWF) by an MTC server, and update the value of the trigger sequence-number counter according to a trigger sequence number included in the trigger message, and return confirmation message to the MTC server.

Preferably, the trigger sequence number is included in a trigger request counter in the trigger message.

With the above-mentioned updating method for the trigger message counter, the machine type communication server and the terminal, the server or the terminal is enabled to set and update the trigger message counter correctly, thus preventing the terminal or the server from detecting, responding to or cancelling the trigger message wrongly.

PREFERRED EMBODIMENTS OF THE INVENTION

In order to make the object, technical scheme and advantage of the present document much more clear and obvious, the embodiment of the present document is described in detail with reference to the accompanying drawings hereinafter. It should be illustrated that, in the case of not conflicting, the embodiments in the present application and features in these embodiments can be combined with each other.

Figure 2:
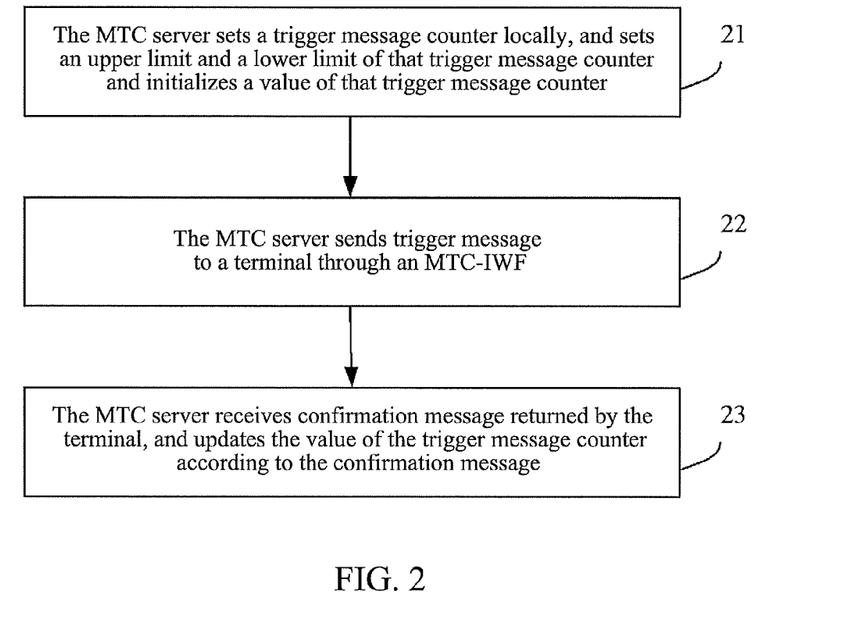
FIG. 2 is a flow chart of an updating method for a trigger message counter according to embodiment one of the present document.

As shown in FIG. 2, it is a flow chart of an updating method for a trigger message counter according to embodiment one of the present document; that embodiment is described from a machine type communication (MTC) server side, and the method includes the following steps:

in step 21, the machine type communication (MTC) server sets a trigger message counter locally, and sets an upper limit and a lower limit of the trigger message counter and initializes a value of the trigger message counter;

the step can include: the above-mentioned MTC server setting a trigger sequence-number counter locally, and setting an upper limit and a lower limit of the trigger sequence-number counter and initializing a value of the sequence-number counter as zero.

In addition, the step further can include: the MTC server setting a trigger attempt counter locally, and setting an upper limit and a lower limit of the trigger attempt counter and initializing a value of the trigger attempt counter as zero.

In step 22, the MTC server sends trigger message to a terminal through a machine type communication-interworking function (MTC-IWF);

the step can include: the MTC server sending the trigger message to the MTC-IWF, the MTC-IWF sending the trigger message to a short message service center (SMS-SC), and the SMS-SC sending the trigger message to the terminal; or, the MTC server sending the trigger message to the MTC-IWF, the MTC-IWF sending the trigger message to a mobility management unit, and the mobility management unit sending the trigger message to the terminal;

in step 23, the MTC server receives confirmation message returned by the terminal, and updates the value of the trigger message counter according to the confirmation message.

The step can include: the above-mentioned MTC server receiving confirmation message representing that the receiving is successful returned by the above-mentioned terminal, and increasing the value of the above-mentioned trigger sequence-number counter by one; or the MTC server receiving confirmation message representing that the receiving is failed returned by the above-mentioned terminal, and keeping the value of the above-mentioned trigger sequence-number counter unchanged.

Accordingly, the step further can include: during the process of the above-mentioned MTC server updating the value of the above-mentioned trigger message counter according to the above-mentioned confirmation message, if the value of the above-mentioned trigger sequence-number counter is increased by one, then the value of the above-mentioned trigger attempt counter keeps unchanged; or, if the value of the above-mentioned trigger sequence-number counter is kept unchanged, then the value of the above-mentioned trigger attempt counter is increased by one.

With the above-mentioned updating method for the trigger message counter, the server is enabled to set and update the trigger message counter correctly, thus preventing the server from detecting, responding to or cancelling the trigger message wrongly.

Figure 3:
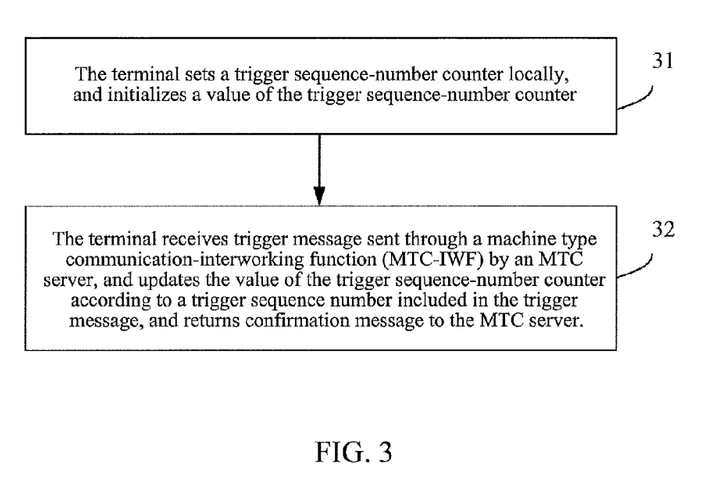
FIG. 3 is a flow chart of an updating method for a trigger message counter according to embodiment two of the present document.

As shown in FIG. 3, it is a flow chart of an updating method for a trigger message counter according to embodiment two of the present document; that embodiment is described from a terminal side, and the method includes the following steps:

in step 31, the terminal sets a trigger sequence-number counter locally, and initializes a value of the trigger sequence-number counter;

wherein, the above-mentioned trigger sequence number is included in a trigger request counter in the trigger message;

in step 32, the terminal receives trigger message sent through a machine type communication-interworking function (MTC-IWF) by an MTC server, and updates the value of the above-mentioned trigger sequence-number counter according to a trigger sequence number included in the above-mentioned trigger message, and returns confirmation message to the above-mentioned MTC server.

With the above-mentioned updating method for the trigger message counter, the terminal is enabled to set and update the trigger message counter correctly, thus preventing the terminal from detecting, responding to or cancelling the trigger message wrongly.

The technical scheme of the present document is described in detail from the point of view of the interaction of the MTC server and the terminal:

Embodiment One the embodiment does not include a trigger attempt counter, and the updating method for a trigger message counter includes the following steps:

in step 101, the MTC server and the terminal set trigger message counters locally respectively after starting up, and the specific setting mode is as follows:

the MTC server sets the trigger sequence-number counter-server (TSC-S) locally, and initializes the value of the TSC-S as 0, and the value range of the TSC-S is $(0, 2^{16}-1)$;

the MTC terminal sets the trigger sequence-number counter-UE (TSC-U) locally, and the value range of the TSC-U is $(0, 2^{16}-1)$.

It should be illustrated that:

after the server sends terminal trigger message successfully, the value of the counter TSC-S is increased by 1; when the value of the TSC-S is $2^{16}-1$, and if the terminal trigger message is sent successfully once again, then the counter is cleared, and starts to recount from zero, which goes round and round;

after receiving the terminal trigger message successfully, the terminal reads the trigger request counter in the trigger message, and sets the value of the counter TSC-U locally according to the trigger sequence number included in the trigger request counter.

In step 102, the MTC server sends the trigger message of the terminal to the MTC-IWF when needing to obtain the real time data from the terminal;

the trigger message includes an identification of the terminal, an identification of the application, an address of the server, a period of validity of a trigger request, and a trigger request counter. The terminal identification is an external identification used outside the network. The trigger request counter includes a trigger sequence number.

It needs to be illustrated that the trigger sequence number is a value of the trigger sequence-number counter TSC-S, and the present terminal trigger message is a first trigger request for the terminal by the server, therefore, at this moment, the value of the counter TSC-S is 0.

In step 103, the MTC-IWF local database stores a one-to-one mapping table between the external identification and the internal identification, and a many-to-one mapping table between the internal identification and a short message service center (SMS-SC). The MTC-IWF analyzes the trigger message, and looks for the internal identification, which is used in the network and corresponds to the terminal identification in the trigger message, such as the international mobile subscriber identity (IMSI), according to the mapping table between the external identification and the internal identification stored in the local database, and looks for the SMS-SC where the terminal is located according to the mapping table between the internal identification and the SMS-SC stored in the database by the internal identification. Later, the MTC-IWF uses the terminal internal identification to replace the terminal external identification in the original trigger message to construct new trigger message, and sends to the SMS-SC through a trigger request signaling;

the new trigger message includes the trigger sequence number and the terminal route information provided by the MTC-IWF, that is, the addresses of the service MME and/or the SGSN and/or the MSC of the terminal.

In step 104, after receiving the trigger request signaling, the SMS-SC analyzes and stores the trigger message included therein, constructs the short message carrying the trigger message, that is, the trigger message is regarded as an information element of the short message, and sends the short message to the terminal through the MME and/or the SGSN and/or the MSC according to the terminal route information in the trigger message. If the terminal receives the trigger message successfully, then the steps 105A-107A are executed; otherwise, the steps 105B-106B are executed.

In step 105A, after receiving the short message, the terminal reads the trigger message included therein, and sets the value of the counter TSC-U locally according to the trigger sequence number in the trigger message, and meanwhile, sends trigger confirmation message to the SMS-SC, to notify the SMS-SC that the trigger message is sent successfully; the confirmation message includes the trigger sequence number and the terminal identification;

it needs to illustrated that the terminal discards the terminal trigger message when detecting locally that the trigger sequence number in the trigger message is the same as (or less than) the value of the counter TSC-U.

In step 106A, after receiving the confirmation message, the SMS-SC reads the terminal identification and the trigger sequence number included therein, removes the corresponding terminal trigger message, and sends the confirmation message to the MTC server, to notify the MTC server that the trigger message is sent successfully.

In step 107A, after receiving the confirmation message, the MTC server reads the terminal identification and the trigger sequence number included therein, removes the corresponding terminal trigger message, and increases the value of the corresponding counter TSC-S by 1.

In step 105B, when detecting that the trigger message is overdue locally according to the period of validity in the trigger message, the SMS-SC removes the terminal trigger message, and notifies the MTC server that the terminal trigger message is failed to be sent through the trigger confirmation message, and the confirmation message includes the trigger sequence number and the terminal identification.

In step 106B, after receiving the confirmation message, the MTC server reads the terminal identification and the trigger sequence number included therein, cancels or resends the terminal trigger message optionally, and the value of the corresponding counter TSC-S is unchanged.

The above-mentioned steps 105A and 105B can be collectively called step 105, and the above-mentioned steps 106A and 106B can be collectively called step 106.

Embodiment Two

The embodiment does not include a trigger attempt counter, and the updating method for a trigger message counter includes the following steps:

step 201 to step 202 are correspondingly the same with step 101 and step 102 in the specific embodiment one.

In step 203, the MTC-IWF local database stores a one-to-one mapping table between the external identification and the internal identification, and a many-to-one mapping table between the internal identification and a mobility management unit (MME/SGSN/MSC). The MTC-IWF analyzes the trigger message, and looks for the internal identification which is used in the network and corresponds to the terminal identification in the trigger message, such as the IMSI, according to the mapping table between the external identification and the internal identification stored in the local database, and looks for the mobility management unit where the terminal is located according to the mapping table between the internal identification and the mobility management unit stored in the database by the internal identification. Later, the MTC-IWF uses the terminal internal identification to replace the terminal external identification in the original trigger message to construct new trigger message, and sends to the MME and/or the SGSN and/or the MSC through a trigger request signaling; and the trigger message includes the trigger sequence number.

In step 204, after receiving the trigger request signaling, the mobility management unit analyzes and stores the trigger message included therein, and inquires the local database to obtain a state of the terminal according to the terminal identification in the trigger message; if the terminal is in an idle state, then the mobility management unit sends paging message to the terminal, and the terminal sends a service request signaling to the mobility management unit after receiving the paging message, to request to establish a non-access stratum (NAS) connection with the mobility management unit. After the NAS connection establishment is finished, the mobility management unit encapsulates the trigger message received from the MTC-IWF into the NAS signaling downlink NAS transport, that is, the trigger message is sent to the terminal as an information element of the NAS signaling; if the terminal is in a connection state, then the mobility management unit encapsulates the trigger message into the NAS signaling Downlink NAS transport directly, and sends to the terminal. If the terminal receives the trigger message successfully, then the steps 205A-207A are executed; otherwise, the steps 205B-206B are executed.

In step 205A, after receiving the NAS signaling, the terminal reads the trigger message included therein, and sets the value of the counter TSC-U locally according to the trigger sequence number in the trigger message, and meanwhile, sends the trigger confirmation message to the mobility management unit to notify the mobility management unit that the trigger message is sent successfully; and the confirmation message includes the trigger sequence number and the terminal identification.

In step 206A, after receiving the confirmation message, the mobility management unit reads the terminal identification and the trigger sequence number included therein, removes the corresponding terminal trigger message, and sends the confirmation message to the MTC server to notify the MTC server that the trigger message is sent successfully.

In step 207A, after receiving the confirmation message, the MTC server reads the terminal identification and the trigger sequence number included therein, removes the corresponding terminal trigger message, and increases the value of the corresponding counter TSC-S by 1.

In step 205B, when detecting that the trigger message is overdue locally according to the period of validity in the trigger message, the mobility management unit removes the terminal trigger message, and notifies the MTC server that the terminal trigger message is failed to be sent through the trigger confirmation message, and the confirmation message includes the trigger sequence number and the terminal identification.

In step 206B, after receiving the confirmation message, the MTC server reads the terminal identification and the trigger sequence number included therein, cancels or resends the terminal trigger message optionally, and the value of the corresponding counter TSC-S is unchanged.

The above-mentioned steps 205A and 205B can be collectively called step 205, and the above-mentioned steps 206A and 206B can be collectively called step 206.

Embodiment Three the embodiment includes a trigger attempt counter, and the updating method for a trigger message counter includes the following steps:

in step 301, the MTC server and the terminal respectively set trigger counters locally after starting up, and the specific setting mode is as follows:

the MTC server sets the trigger sequence-number counter TSC-S locally, and initializes the value of the TSC-S as 0, and the value range of the TSC-S is $(0, 2^{16}-1)$;

the MTC server sets the trigger attempt counter (TAC) locally, initializes the value of the TAG as 0, and the value range of the TAG is (0, 5);

the MTC terminal sets the trigger sequence-number counter TSC-U locally, and the value range of the TSC-U is (0, 216−1).

It should be illustrated that, every time the server attempts to send the same terminal trigger message (the same trigger sequence number), the value of the counter TAC is increased by 1; if that terminal trigger message is attempted to be sent successfully, and the server initiates a sending attempt of the next terminal trigger message (the next trigger sequence number), then the counter TAC is cleared to start to recount from zero; when the value of the counter TAC is 5, and if that terminal trigger message is attempted to be sent again and the sending is failed, then the server cancels the trigger request, and when the server initiates the sending attempt of the next terminal trigger message, the counter TAC is cleared to start to count from zero.

In step 302, the MTC server sends the trigger message of the terminal to the MTC-IWF when needing to obtain the real time data from the terminal;

the trigger message includes an identification of the terminal, an identification of the application, an address of the server, a period of validity of a trigger request, and a trigger request counter. The terminal identification is an external identification used outside the network. The trigger request counter includes a trigger sequence number.

It needs to be illustrated that, it is a first sending attempt of the present terminal trigger message this time, therefore, at this moment, the value of the counter TAG is 0.

Steps 303 to 306 are correspondingly the same with steps 103 to 106 in the embodiment one.

In step 307A, after receiving the confirmation message, the MTC server reads the terminal identification and the trigger sequence number included therein, removes the corresponding terminal trigger message, and increases the value of the corresponding counter TSC-S by 1; and the value of the corresponding counter TAG is unchanged.

In step 307B, if the MTC server selects to resend the trigger message of the terminal, then the value of the corresponding counter TSC-S is unchanged, and the value of the corresponding counter TAG is increased by 1.

The above-mentioned steps 307A and 307B can be collectively called step 307.

It needs to be illustrated that it is a second sending attempt of the present terminal trigger message this time, therefore, at this moment, the value of the counter TAG is 1. When locally detecting that the value of the counter TAC corresponding to the terminal trigger message which is attempted to be sent is 5, then the server cancels the terminal trigger message; when the server initiates the sending attempt of the next terminal trigger message, the counter TAC is cleared to start to count from zero.

Embodiment Four

The embodiment includes a trigger attempt counter, and the updating method for a trigger message counter includes the following steps:

Steps 401 to 402 are correspondingly the same with steps 301 to 302 in the specific embodiment three;

steps 403 to 406 are correspondingly the same with steps 203 to 206 in the specific embodiment two;

step 407 is correspondingly the same with step 307 in the specific embodiment three.

Figure 4:
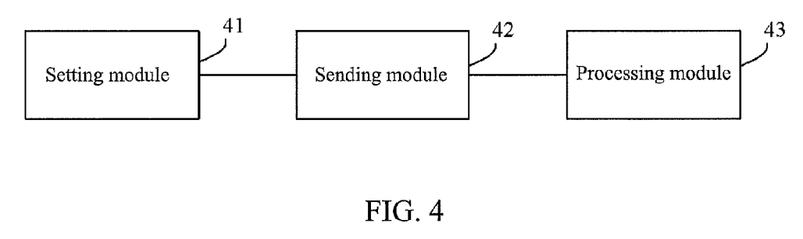
FIG. 4 is a structure diagram of an MTC server according to an embodiment of the present document.

As shown in FIG. 4, it is a structure diagram of an MTC server according to an embodiment of the present document; the MTC server includes a setting module 41, a sending module 42 and a processing module 43, wherein, the setting module 41 is configured to set a trigger message counter locally, and set an upper limit and a lower limit of the trigger message counter and initialize a value of the trigger message counter;

the sending module 42 is configured to send trigger message to a terminal through a machine type communication-interworking function (MTC-IWF); and the processing module 43 is configured to receive confirmation message returned by the terminal, and update the value of the trigger message counter according to the confirmation message.

Wherein, the setting module 41 is specifically configured to set a trigger sequence-number counter locally, and set an upper limit and a lower limit of the trigger sequence-number counter and initialize a value of the sequence-number counter as zero. The processing module is specifically configured to receive the confirmation message representing that the receiving is successful returned by the terminal, and increase the value of the trigger sequence-number counter by one; or receive the confirmation message representing that the receiving is failed returned by the terminal, and keep the value of the trigger sequence-number counter unchanged. In addition, the processing module is further configured to resets the value of the trigger sequence-number counter as zero after determining that the value of the trigger sequence-number counter exceeds the upper limit In addition, the setting module 41 is further configured to set a trigger attempt counter locally, and set an upper limit and a lower limit of the trigger attempt counter and initialize a value of the trigger attempt counter as zero. The sending module is further configured to: every time sending the trigger message with a same trigger sequence number to the terminal through the MTC-IWF, increase the value of the trigger attempt counter by one; or, if sending the trigger message of a next trigger sequence number to the terminal through the MTC-IWF, then reset the value of the trigger attempt counter as zero; or, if the value of the trigger attempt counter equals to the upper limit of the trigger attempt counter and the trigger message of a current trigger sequence number is failed to be sent, then reset the value of the trigger attempt counter as zero when initiating the trigger message of the next trigger sequence number. The processing module is further configured to: if the value of trigger sequence-number counter is increased by one, then keep the value of the trigger attempt counter unchanged; or, if the value of trigger sequence-number counter is kept unchanged, then increase the value of the trigger attempt counter by one.

The above-mentioned MTC server can set and update the trigger message counter correctly, and the realization procedure thereof can refer to embodiments one to four and will not go into detail here.

Figure 5:
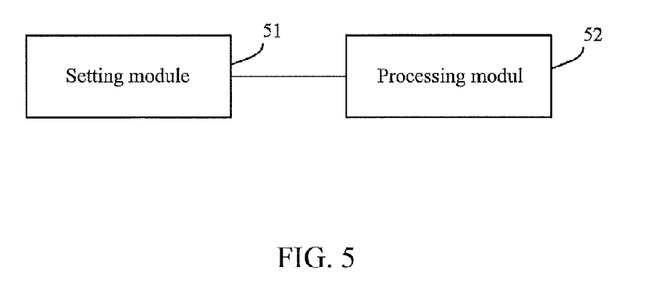
FIG. 5 is a structure diagram of a terminal according to an embodiment of the present document.

As shown in FIG. 5, it is a structure diagram of a terminal according to an embodiment of the present document. The terminal includes a setting module 51 and a processing module 52, wherein, the setting module 51 is configured to set a trigger sequence-number counter locally, and initialize a value of the trigger sequence-number counter; and the processing module 52 is configured to receive trigger message sent through a machine type communication-interworking function (MTC-IWF) by an MTC server, and update the value of the trigger sequence-number counter according to a trigger sequence number included in the trigger message, and return confirmation message to the MTC server.

Wherein, the trigger sequence number is included in a trigger request counter in the trigger message.

The above-mentioned terminal can set and update the trigger message counter correctly, and the realization procedure thereof can refer to embodiments one to four and will not go into detail here.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not to limit, and the present document is described in details only referring to the preferable embodiments. Those skilled in the art should understand that they can make the modifications and equivalents according to the technical scheme of the present document without departing from the spirit and scope of the present document, which should be embodied in the scope of the appended claims of the present document.

INDUSTRIAL APPLICABILITY

With the above-mentioned updating method for the trigger message counter, the machine type communication server and the terminal, the server or the terminal is enabled to set and update the trigger message counter correctly, thus preventing the terminal or the server from detecting, responding to or cancelling the trigger message wrongly.

I claim:

1. An updating method for a trigger message counter, the method comprising:
 a machine type communication (MTC) server setting a trigger message counter locally, setting an upper limit and a lower limit of the trigger message counter and initializing a value of the trigger message counter;
 the MTC server sending trigger message to a terminal through a machine type communication-interworking function (MTC-IWF);
 the MTC server receiving confirmation message returned by the terminal, and updating the value of the trigger message counter according to the confirmation message;
 wherein,
 the MTC server sending the trigger message to the terminal through the MTC-IWF comprises:

the MTC server sending the trigger message to the MTC-IWF, wherein the trigger message contains an external identification of the terminal and a trigger sequence number;

the MTC-IWF receiving the trigger message, finding a short message service center (SMS-SC) where the terminal is located according to the external identification of the terminal contained in the trigger message, and an one-to-one mapping table between the external identification and an internal identification of the terminal and a many-to-one mapping table between the internal identification and the SMS-SC stored locally, and sending newly-structured trigger message to the found SMS-SC, wherein the newly-structured trigger message contains the trigger sequence number and terminal route information;

the SMS-SC receiving the newly-structured trigger message, and sending short message carrying the newly-structured trigger message to the terminal through a mobility management unit according to the terminal route information contained in the newly-structured trigger message; and wherein, the mobility management unit comprises one or more of a mobility management entity (MME), a Service General Packet Radio Service (GPRS) Supporting Node (SGSN) and a Mobile Switching Center (MSC).

2. The method according to claim 1, wherein, the MTC server setting a trigger message counter locally, setting an upper limit and a lower limit of the trigger message counter and initializing a value of the trigger message counter comprises:

the MTC server setting a trigger sequence-number counter locally, and setting an upper limit and a lower limit of the trigger sequence-number counter and initializing a value of the sequence-number counter as zero.

3. The method according to claim 2, wherein, the MTC server receiving confirmation message returned by the terminal, and updating the value of the trigger message counter according to the confirmation message comprises:

the MTC server receiving confirmation message representing that the receiving is successful returned by the terminal, and increasing the value of the trigger sequence-number counter by one; or the MTC server receiving confirmation message representing that the receiving is failed returned by the terminal, and keeping the value of the trigger sequence-number counter unchanged.

4. The method according to claim 3, wherein, after the MTC server receives the confirmation message representing that the receiving is failed returned by the terminal, the method further comprises:

the MTC server canceling or resending the trigger message.

5. The method according to claim 3, wherein, after the MTC server increases the value of the trigger message counter by one, the method further comprises:

after the MTC server determines that the value of the trigger sequence-number counter exceeds the upper limit, the MTC server resetting the value of the trigger sequence-number counter as zero.

6. The method according to claim 1, wherein, the MTC server sending the trigger message to the terminal through the MTC-IWF comprises:

the MTC server sending the trigger message to the MTC-IWF, wherein, the trigger message contains the external identification of the terminal and the trigger sequence number;

the MTC-IWF receiving the trigger message, finding a mobility management unit where the terminal is located according to the external identification of the terminal contained in the trigger message, and an one-to-one mapping table between the external identification and an internal identification of the terminal and a many-to-one mapping table between the internal identification and the mobility management unit stored locally, and sending newly-structured trigger message to the found mobility management unit, wherein, the newly-structured trigger message contains the trigger sequence number and the internal identification of the terminal;

the mobility management unit receiving the newly-structured trigger message, and sending a non-access lay signaling (NAS) carrying the newly-structured trigger message to the terminal;

wherein, the mobility management unit comprises one or more of the MME, the SGSN and the MSC.

7. The method according to claim 1, wherein, the MTC server setting the trigger message counter locally, and setting the upper limit and the lower limit of the trigger message counter and initializing the value of the trigger message counter further comprises:

the MTC server setting a trigger attempt counter locally, and setting an upper limit and a lower limit of the trigger attempt counter and initializing a value of the trigger attempt counter as zero.

8. The method according to claim 7, wherein, during a process of the MTC server sending the trigger message to the terminal through the MTC-IWF, every time the MTC server sends the trigger message of a same trigger sequence number to the terminal through the MTC-IWF, the value of the trigger attempt counter is increased by one; or, if the MTC server sends the trigger message of a next trigger sequence number to the terminal through the MTC-IWF, then the value of the trigger attempt counter is reset as zero; or, if the value of the trigger attempt counter equals to the upper limit of the trigger attempt counter, the MTC server fails to send the trigger message of a current trigger sequence number, then the MTC server cancels the trigger message of the current trigger sequence number, and resets the value of the trigger attempt counter as zero when initiating the trigger message of the next trigger sequence number.

9. The method according to claim 8, wherein, during a process of the MTC server updating the value of the trigger message counter according to the confirmation message, if the value of the trigger sequence-number counter is increased by one, then the value of the trigger attempt counter keeps unchanged; or, if the value of the trigger sequence-number counter is kept unchanged, then the value of the trigger attempt counter is increased by one.

10. A machine type communication (MTC) server comprising:

a hardware processor; and a storage device for storing executable instructions that when executed by the hardware processor cause the hardware processor to perform steps in modules as follows:

a setting module configured to set a trigger message counter locally, and set an upper limit and a lower limit of the trigger message counter and initialize a value of the trigger message counter;
a sending module configured to send trigger message to a terminal through a machine type communication-interworking function (MTC-IWF);
a processing module configured to receive confirmation message returned by the terminal, and update the value of the trigger message counter according to the confirmation message;
wherein the sending module is configured to send the trigger message to a terminal through a machine type communication-interworking function (MTC-IWF) by the following way:
the sending module sending the trigger message to the MTC-IWF, wherein the trigger message contains an external identification of the terminal and a trigger sequence number;
the MTC-IWF receiving the trigger message, finding a short message service center (SMS-SC) where the terminal is located according to the external identification of the terminal contained in the trigger message, and a one-to-one mapping table between the external identification and an internal identification of the terminal and a many-to-one mapping table between the internal identification and the SMS-SC stored locally, and sending newly-structured trigger message to the found SMS-SC, wherein the newly-structured trigger message contains the trigger sequence number and terminal route information;
the SMS-SC receiving the newly-structured trigger message, and sending short message carrying the newly-structured trigger message to the terminal through a mobility management unit according to the terminal route information contained in the newly-structured trigger message; and
wherein the mobility management unit comprises one or more of a mobility management entity (MME), Service General Packet Radio Service (GPRS) Supporting Node (SGSN) and a Mobile Switching Center (MSC).

11. The MTC server according to claim 10, wherein,
the setting module is configured to set a trigger sequence-number counter locally, and set an upper limit and a lower limit of the trigger sequence-number counter and initialize a value of the sequence-number counter as zero.

12. The MTC server according to claim 11, wherein,
the processing module is configured to receive confirmation message representing that the receiving is successful returned by the terminal, and increase the value of the trigger sequence-number counter by one; or receive confirmation message representing that the receiving is failed returned by the terminal, and keep the value of the trigger sequence-number counter unchanged.

13. The MTC server according to claim 12, wherein,
the processing module is further configured to reset the value of the trigger sequence-number counter as zero after determining that the value of the trigger sequence-number counter exceeds the upper limit.

14. The MTC server according to claim 10, wherein,
the setting module is further configured to set a trigger attempt counter locally, and set an upper limit and a lower limit of the trigger attempt counter and initialize a value of the trigger attempt counter as zero.

15. The MTC server according to claim 14, wherein,
the sending module is further configured to: every time sending the trigger message of a same trigger sequence number to the terminal through the MTC-IWF, increase the value of the trigger attempt counter by one; or, if sending the trigger message of a next trigger sequence number to the terminal through the MTC-IWF, then reset the value of the trigger attempt counter as zero; or, if the value of the trigger attempt counter equals the upper limit of the trigger attempt counter and the trigger message of a current trigger sequence number is failed to be sent, then reset the value of the trigger attempt counter as zero when initiating the trigger message of the next trigger sequence number,
or,
wherein the processing module is further configured to: if the value of trigger sequence-number counter is increased by one, then keep the value of the trigger attempt counter unchanged; or, if the value of trigger sequence-number counter is kept unchanged, then increase the value of the trigger attempt counter by one.

* * * * *